United States Patent
Maisotsenko et al.

(10) Patent No.: US 6,779,351 B2
(45) Date of Patent: Aug. 24, 2004

(54) FUEL CELL SYSTEMS WITH EVAPORATIVE COOLING AND METHODS FOR HUMIDIFYING AND ADJUSTING THE TEMPERATURE OF THE REACTANT STREAMS

(75) Inventors: Valeriy Maisotsenko, Aurora, CO (US); Leland E. Gillan, Denver, CO (US); Timothy L. Heaton, Arvada, CO (US); Alan D. Gillan, Denver, CO (US)

(73) Assignee: Idalex Technologies, Inc., Arvada, CO (US)

( * ) Notice: Subject to any disclaimer, the term of this patent is extended or adjusted under 35 U.S.C. 154(b) by 0 days.

(21) Appl. No.: 10/373,309

(22) Filed: Feb. 24, 2003

(65) Prior Publication Data

US 2003/0177771 A1 Sep. 25, 2003

Related U.S. Application Data

(63) Continuation-in-part of application No. 10/316,775, filed on Dec. 11, 2002, now Pat. No. 6,705,096, which is a continuation-in-part of application No. 09/966,928, filed on Sep. 27, 2001, now Pat. No. 6,581,402.
(60) Provisional application No. 60/358,907, filed on Feb. 22, 2002, provisional application No. 60/341,206, filed on Dec. 12, 2001, and provisional application No. 60/236,047, filed on Sep. 27, 2000.

(51) Int. Cl.[7] .............................................. F28C 1/00
(52) U.S. Cl. ............................ 62/121; 62/314; 429/19; 429/20
(58) Field of Search ......................... 62/121, 314, 305, 62/309, 310; 429/13, 17, 19, 25, 26, 30, 33, 34

(56) References Cited

U.S. PATENT DOCUMENTS

| | | | |
|---|---|---|---|
| 4,002,040 A | 1/1977 | Munters et al. ............... | 62/121 |
| 4,795,683 A | 1/1989 | McElroy | |
| 4,824,740 A | 4/1989 | Abrams et al. | |
| 4,994,331 A | 2/1991 | Cohen | |
| 5,187,946 A | 2/1993 | Rotenberg et al. ............ | 62/314 |
| 5,212,956 A | 5/1993 | Tsimerman ..................... | 62/94 |
| 5,349,829 A | 9/1994 | Tsimerman ..................... | 62/314 |
| 5,382,478 A * | 1/1995 | Chow et al. ..................... | 429/26 |
| 5,664,433 A | 9/1997 | Bourne et al. ................. | 62/314 |
| 5,727,394 A | 3/1998 | Belding .......................... | 62/94 |
| 5,860,284 A | 1/1999 | Goland et al. ................. | 62/94 |
| 5,931,016 A | 8/1999 | Yoho, Sr. ....................... | 62/271 |
| 6,013,385 A * | 1/2000 | DuBose ......................... | 429/17 |
| 6,018,953 A | 2/2000 | Belding .......................... | 62/94 |
| 6,106,964 A * | 8/2000 | Voss et al. ..................... | 429/20 |
| 6,237,900 B1 | 5/2001 | Drew et al. ................... | 261/111 |
| 6,282,915 B1 | 9/2001 | Egbert ........................... | 62/314 |
| 6,630,260 B2 * | 10/2003 | Forte et al. .................... | 429/19 |

* cited by examiner

Primary Examiner—Chen Wen Jiang
(74) Attorney, Agent, or Firm—Jennifer L. Bales; Macheledt Bales & Heidmiller LLP (57) ABSTRACT

A fuel cell using fuel and oxidant resulting in the production of water and heat in addition to electrical power. The fuel cell employs an evaporative cooler and has methods to adjust the moisture and temperature for the fuel and oxidant flows to improve the fuel cell efficiency. The water produced by the fuel cell is used to provide the water for wet channels of the evaporative cooler. The evaporative cooler has separate product channels and dry working channels that are cooled by heat transfer across a heat exchanger plate. The heat exchanger plate forms part of each wet working channel on the wet side of the heat exchanger plate and part of the product channel and the dry working channel on the dry side. The fuel passes first through the dry working channel then the wet working channel becoming humidified by the evaporation therein and cooling the heat exchanger plate before going to the anode of the fuel cell. The oxidant is cooled by passing through the product channel before being directed to the cathode. In another embodiment, the evaporative cooler is incorporated with the fuel cell and is formed by an anode separator, with the fuel flowing by a dry side of the heat exchanger plate of the anode separator that is being cooled by the evaporation on the wet side. The evaporation adding moisture to the fuel as it passes by the wet side and the heat exchanger plate cooling the fuel on the dry side.

7 Claims, 9 Drawing Sheets

FUEL CELL SYSTEMS WITH EVAPORATIVE COOLING AND METHODS FOR HUMIDIFYING AND ADJUSTING THE TEMPERATURE OF THE REACTANT STREAMS

RELATED APPLICATIONS

This application is a continuation-in-part of U.S. patent application Ser. No. 09/966,928 filed Sep. 27, 2001 now U.S. Pat. No. 6,581,402 which claims the benefit of U.S. Provisional Patent Application Serial No. 60/236,047 filed Sep. 27, 2000. This application is also a continuation-in-part of U.S. patent application Ser. No. 10/316,775 filed Dec. 11, 2002 now U.S. Pat. No. 6,705,096 which claims the benefit of U.S. Provisional Patent Application Serial No. 60/341,206 filed Dec. 12, 2001. This application additionally claims the benefit of U.S. Provisional Patent Application Serial No. 60/358,907 filed Feb. 22, 2002. All of these applications are incorporated herein by reference.

BACKGROUND OF THE INVENTION

1. Field of the Invention

The present invention relates to the field of electrochemical fuel cells such as proton exchange membrane (PEM) fuel cells with thermal and moisture management. More particularly, the present invention relates to fuel cell systems with evaporative cooling and methods for humidifying and adjusting the temperature of the reactant streams.

2. Discussion of the Background

Electrochemical fuel cells generate electrical energy by converting chemical energy derived from a fuel directly into electrical energy by oxidation of the fuel in the cell. A typical fuel cell includes an anode, a cathode and an electrolyte. The reactant streams as fuel and oxidant are supplied to the anode and cathode, respectively. In electrochemical fuel cells employing hydrogen as the fuel and oxygen containing gas as the oxidant, the reaction product is water. At the anode, the fuel permeates the electrode material and reacts at the anode catalyst layer to form cations, which migrate through the electrolyte to the cathode. At the cathode, the oxygen containing gas supply reacts at the cathode catalyst layer to form anions. The anions react with cations to form a reaction product. The fuel cell generates a useful electric current and the reaction product is removed from the cell. The ion exchange membrane facilitates the migration of hydrogen ions from the anode to the cathode. In addition to conducting hydrogen cations, the membrane isolates the hydrogen fuel stream from the oxidant stream. The anions $O_2^-$ formed at the cathode react with hydrogen ions $2H_2^+$ that have crossed the membrane to form liquid water as the reaction product.

Unfortunately, it is not only electricity and product water that are generated during this process but also heat. The heat is produced primarily at the cathode when the hydrogen and oxygen ions combine. Some of this heat (about one third or less) can be removed by conventional evaporation of this product water, but the remaining heat must be removed by other means.

There is also another problem for reliable operation of fuel cells. Hydrogen ion conductivity through ion exchange membranes generally requires the presence of water molecules. The fuel and oxidant gases (especially fuel) are humidified prior to introducing them to the cell to maintain the water saturation of the membranes within the membrane electrode assembly. Currently, the most popular, perfluorosulfonic ion exchange membranes, such as those sold by DuPont under its Nafion trade designation, must be hydrated or saturated with water molecules for ion transport to occur. It is well known that such perfluorosulfonic membranes transport cations using a "water pumping" phenomenon. Water pumping involves the transport of cations in conjunction with water molecules, resulting in a net flow of water from anode side of the membrane to the cathode side. Thus, membranes can dry out on the anode side if water molecules are not resupplied.

Fuel cells employing such membranes require water to be removed from the cathode side. There must not be so much water that electrodes, which are bonded to the electrolyte, flood and thereby block the pores in the electrodes or gas diffusion layer. A balance is therefore needed.

There are other important aspects of the methods of operation of fuel cell systems and fuel cell design. The most important considerations (especially for PEM fuel cells) are the method of cooling and adjusting the temperature of the reactant streams for the fuel cell, the process of humidifying the reactant streams, and the water management for the fuel cell.

Cooling for the fuel cell has been provided by reactants, natural convection, radiation, and possible supplemental cooling channels and/or cooling plates. The herein system uses an evaporative cooling process as the mechanism to provide cooling, either to coolants or to the reactant gases.

In this regard, U.S. Pat. No. 3,761,316 discloses a fuel cell with evaporative cooling. A fuel cell assembly utilizing the waste heat of a fuel cell to provide evaporative cooling of the cell is provided by a hydrophobic separator disposed in heat conducting relationship with the fuel cell. A coolant liquid (water) is fed under pressure to a cavity on one side of the hydrophobic separator, and as vapor evolves from the coolant liquid, it passes through the hydrophobic separator to ambient.

In U.S. Pat. No. 4,795,683, a method of evaporative cooling a PEM fuel cell is disclosed where liquid water mist is introduced into the anode. A desiccant material directs the liquid water mist to the ion exchange membrane. Evaporation of a portion of both the product water and the supplied liquid water cools the cell and eliminates the need for separate cooling chamber.

U.S. Pat. No. 4,824,741 discloses a fuel cell utilizing a solid polymer electrolyte membrane cooled by evaporation of water in the hydrogen reactant chamber of the cells. A porous graphite plate or water permeated membrane is disposed in the hydrogen reactant chamber adjacent to the electrolyte membrane. If a graphite plate is used, it is preferably grooved on the surface facing the electrolyte. The resultant lands preferably contact the supported catalyst layer on the membrane to cool the latter. Water is forced into the pores of the plate or membrane from the edge thereof, and the water vapor is carried out of the cells in the hydrogen reactant exhaust stream.

U.S. Pat. No. 5,262,249 describes an internally cooled PEM fuel cell device. It includes a pair of substantially coextensive electrode components each of which includes a porous central region and a fluid impermeable peripheral region circumferentially completely surrounding the central region. It also includes a proton exchange membrane component interposed between at least the central regions of the electrode component. The fuel cell device further includes an arrangement for cooling the fuel cell, including at least one enclosed cooling channel situated at the peripheral region of one of the electrode components and supplied with fresh cooling medium, with the spent cooling medium being discharged from the cooling channel. There is further provided a heat transfer device that is operative to transfer heat from the central region to the peripheral region on the one electrode component.

All previously known and available evaporative cooling methods and designs for fuel cells have one common disadvantage in that the maximum cool temperature that may be reached is the wet bulb temperature of outside air, which cannot guarantee efficient rejection of heat from a fuel cell. This limited maximum of cooling that can occur has proven to be commercially disadvantageous to current fuel cell systems and apparatuses especially for PEM fuel cells. Because of the indirect and direct cooling, the herein invention yields a lower temperature that is below the wet bulb temperature and approaching the dew point temperature.

There are many methods and designs for humidifying fuel cells. For example, U.S. Pat. No. 5,382,478 discloses an electrochemical fuel cell stack, which has a humidifying section located upstream from the electrochemically active section. The inlet fuel and oxidant streams are introduced into the humidifying section without first being directed through the electrochemically active section. The upstream location of the humidification section in the stack enables the number of manifold opening in the active section to be reduced.

U.S. Pat. No. 5,432,020 describes a process and an apparatus humidifying the process gas for operating fuel cell systems. To ensure high efficiency, the process gas must be introduced at a predetermined temperature and humidity. A metered quantity of fine water droplets is injected into the gas supply line, by way of which the process air is humidified. If the fuel cell is operated under pressure, the process air generally has to be cooled after it has been compressed. The process air is automatically cooled as a result of a partial evaporation of the water droplets while the residual quantity of water in the form of droplets is introduced into the fuel cell.

It is desirable to have high humidification of the reactant gases in PEM fuel cells operating above about 60 degrees C. This has been confirmed by the general experience of PEM fuel cells users. However, this desirable feature can make it difficult to choose the optimum operating temperature for the fuel cells. The higher the temperature, the better the performance, mainly because the cathode overvoltage is reduced. However, once above 60 degrees C. the humidification problems increase, and the extra weight and cost of the humidification equipment can exceed the savings derived from having a smaller and lighter fuel cell. It is obviously desirable to run PEM fuel cells without externally humidifying the reactant gases as it reduces cost, size and complexity.

Buchi and Srinivasan have described the humidification process for PEM fuel cells (see Buchi F. N., Srinivasan S., (1997) "Operating proton exchange membrane fuel cells without external humidifying of the reactant gases. Fundamental aspects." Journal of the Electrochemical Society, vol. 144, N8, pp2767–2772). There it is shown that even below 60 degrees C. the maximum power from a fuel cell is reduced by about 40% if no external humidification is used.

In small systems, this can be a price worth paying. One way of doing this is also described by Buchi and Srinivasan in which the oxygen and hydrogen flows are in opposite directions across the membrane electrode assembly. The water flow from anode to cathode is the same in all parts, as is the "electro-osmotic drag", and is directly proportional to the current. The back diffusion from cathode to anode varies, but is compensated for by the gas circulation. Other aids to an even spread of humidity are narrow electrodes and thicker gas diffusion layers, which hold more water.

Engineers at Paul Scherrer Institute in Switzerland have demonstrated an external humidification system for fuel cells (see Kiefer J. et al "Radiation grafting a versatile membrane preparation tool for fuel cell applications", Proceedings of the European Fuel Cell Forum Portable Fuel Cells conference, Lucerne, pp227–235, 1999). The warm damp air leaving the cell passes over one side of a membrane, where it is cooled. Some of the water condenses on the membrane. The liquid water passes through the membrane and is evaporated by the drier gas going into the cell on the other side. In this case, for example a 2.0 kW fuel cell, only the air is humidified. The membrane electrode assembly is particularly thin, and this permits the anode side to be hydrated by back diffusion.

Another approach for humidifying fuel cells is to directly inject liquid water into the fuel cell (for example, see U.S. Pat. No. 4,826,742). But this can lead to the electrode flooding and the cell ceasing to work.

All known and available humidifying methods and designs for fuel cells have one common drawback in that they normally cannot insure the necessary quantity of water molecules for hydrogen ion conductivity through the ion exchange membranes. All previously known evaporative humidification processes are not effective and have limited humidity corresponding to the wet bulb temperature of outside air. The present invention overcomes this drawback.

Fuel cells employing such prior membranes require water to be removed from the cathode (oxidant) side. There are many methods and designs for this purpose. For example, U.S. Pat. No. 4,826,741 describes an ion exchange fuel cell assembly with improved water management, where this fuel cell are characterized by a liquid permeable electricity-conductive member in the form of a layer for storage and transport of water produced in the fuel cell. The fluid permeable member is separated from the electrodes and the fuel cell is contained between outer impermeable sheets.

A method and an apparatus for removing water from electrochemical fuel cells are described in U.S. Pat. No. 5,441,819. In them, liquid water accumulated at the cathode can be removed by maintaining a partial pressure of water vapor in the hydrogen-containing gas supply below the saturation pressure of water vapor therein. Water accumulated at the cathode is drawn by a concentration gradient toward the anode across the membrane and is absorbed as water vapor into the hydrogen-containing gas supply between the inlet and the outlet.

U.S. Pat. No. 5,503,944 discloses a water management system for solid polymer electrolyte fuel cell. Water appearing on the cathode side of each cell membrane is pumped into the water circulation passages through the porous oxidant reactant flow field plates. A positive pressure drop created between the cathode reactant flow field of each cell and the coolant water circulation passages between each cell is used to pump the water.

Management of water migration within known fuel cell devices is inefficiently realized and has complicated designs. The product water must be drawn away from the cathode side of the cells, and makeup water must be provided to the anode side of the cells in amounts to prevent dryout, while avoiding flooding, of the anode side of the electrolyte membrane. Simultaneously it is necessary to reject heat from the cathode side of the electrolyte membrane.

Using previously known methods and designs, it is impossible to efficiently realize these various actions simultaneously. This in turn decreases productivity of the fuel cells. The present invention addresses this problem.

U.S. Pat. No. 6,106,964 discloses a method for humidifying and adjusting the temperature of a reactant gas stream supplied to PEM fuel cell. In it, an exhaust reactant stream from a fuel cell (for example, air) is used to heat and humidify an air stream supplied to the fuel cell. In this case, the exhaust reactant stream exiting the fuel cell will typically be warmer and have a higher partial pressure of water pressure than the supply reactant stream. The reactant gas supply streams for the PEM fuel cell include a fuel supply stream (for example, hydrogen) and an oxidant supply stream (for example, air) that are supplied to fuel and oxidant inlet ports of the fuel cell respectively. The PEM fuel cell also typically has both a fuel exhaust stream and an oxidant exhaust stream exiting the fuel cell via fuel and oxidant exhaust ports. However one of the reactants may be essentially dead-ended with optional intermittent venting of inert components. In this manner, water and heat in the conventional method are transferred from the reactant gas exhaust stream to the reactant gas supply stream across the water permeable membrane of the combined heat and humidity exchanger.

Known methods and systems (such as U.S. Pat. No. 6,106,964) for humidifying and adjusting the temperature of a reactant gas stream supplied to PEM fuel cells have major disadvantages. First, they cannot organize the efficient cooling process to reject heat from a fuel cell. Additionally, the methods are inefficient in providing the humidifying process for the reactant gas supply stream, because the evaporative humidifying processes are limited by the wet bulb temperature of outside air. Using known combinations of heat and humidity exchangers it is possible to get only one heated and moistened useful product, either a fuel supply stream or an oxidant supply stream of the fuel cell. But this is not enough for effective operation of a fuel cell. Usually a fuel cell also needs to use a coolant stream (air or water). In this connection, U.S. Pat. No. 6,106,964, employs an additional apparatus as a cooler for a coolant stream. Moreover, it is sometimes necessary (in addition to the cooling of a coolant) to humidify a fuel supply stream and an oxidant supply stream of the fuel cell simultaneously. Again, known methods cannot do it as they cannot perform the processes of humidifying and adjusting the temperature of a reactant stream and simultaneously cooling a conditioned space.

The new and novel fuel cell systems of the present invention with indirect and direct evaporative cooling combine the humidifying of reactant streams, adjusting the temperature of the reactant streams, and managing water and thus avoid the above-mentioned drawbacks.

SUMMARY OF THE INVENTION

The purpose of this invention is to increase the efficiency of operation of fuel cell systems, such as proton exchange membrane (PEM) fuel cells. In one embodiment, it is accomplished by more efficient processes of cooling of a coolant and humidifying a fuel supply stream and/or an oxidant supply stream of the fuel cell simultaneously, using only one additional inexpensive device. In another embodiment all the operative processes of cooling and humidifying are realized inside the system without any additional device.

In the first embodiment, an evaporative cooler is used. One example of this apparatus is described in detail in co-owned PCT Applications PCT/US01/04081 and PCT/US01/04082 filed in Feb. 7, 2001, which are incorporated herein by reference. Another example is the apparatus of co-owned PCT application PCT/US01/30468 filed Sep. 27, 2001, also incorporated herein by reference. This apparatus contains product channels for product fluids and dry and wet working channels with inlets and outlets for working fluids, for example air or gas. Product (air or any kind of gas or liquid) is cooled inside the product channels below the wet bulb temperature, approaching the dew point temperature without adding humidity to the product fluid.

The resultant cold and dry product air is directed to the cathode of a fuel cell. In this case, the cold and dry air performs two functions: first, it is an oxidant supply stream for the fuel cell and second, it is coolant for the fuel cell. Passing through the cathode of a fuel cell, this air actively absorbs heat, which is produced at the cathode when the hydrogen ions and oxygen combine. Simultaneously a fuel supply stream (for example, hydrogen) as a working gas is passing first into a dry working channel and later a wet working channel of the evaporative cooler and gains moisture for the hydrogen, thus aiding the hydrogen conductivity through the ion exchange membrane. After its exit from the apparatus, it is directed to the anode of a fuel cell. The absolute humidity of this resultant fuel supply stream is always more than by any other known methods of moistening. This aids the increase of hydrogen ion conductivity through the ion exchange membranes and consequently the efficiency of operation of the fuel cell system. Further efficiency occurs as the added moisture for the wet working channels of the apparatus is obtained by water product from the cathode of the fuel cell. The anions formed at the cathode react with hydrogen ions that have crossed the membrane to form water as the reaction product and thus is available. It is clean water, which does not create any kind of deposit build up on the surface of a fuel cell.

Sometimes an apparatus such as the above dew point indirect evaporative cooler can be used not only for supporting the operation of the fuel cell system, but also as an air conditioner for a conditioned space or a cabin of a vehicle at a separate location from the fuel cell. In this case cold product air, after its exit from an apparatus for dew point indirect evaporative cooling, is divided into two cold flows with one being directed as air reactant stream (oxidant) to the cathode of a fuel cell and the other to a consumer, for example, in a conditioned space or a cabin of a vehicle.

Sometimes there is a necessity to humidify only an oxidant supply stream. In such cases, outside air as an oxidant supply stream is directed into working channels and hot coolant is directed into product channels of the apparatus for dew point indirect evaporative cooling. Passing through these channels, moist air is directed to a cathode and cold coolant is used for rejection heat from a fuel cell or other uses.

The present invention can perform the humidifying processes for both reactant gas supply streams of a fuel cell (i.e. the oxidant supply and the fuel supply streams) simultaneously. To improve the action of the hydrogen ion conductivity through the ion exchange membranes by adding water molecules, the apparatus can cool coolant (when it is passing through the product channels) and humidify the oxidant supply stream as well as fuel supply stream simultaneously when they are passing through the separate working channels. The design of the apparatus for dew point indirect evaporative cooling allows separation of the reactant streams.

The design of the apparatus permits dividing not only the working channels for separate use and treatment of the reactant gas (hydrogen) and air (oxidant)) streams in them but also separate use of the product channels for coolant and outside air (oxidant) streams. In connection with this scheme it is possible simultaneously to organize the cooling process for outside air before its intake by an air compressor and its subsequent use as an oxidant stream for the fuel cell. Cooling of the air stream, before its intake by the air compressor, increases the density of air stream and decreases the consumption of energy by the compressor.

It is beneficial to have one apparatus in a single design which can simultaneously humidify the fuel supply and oxidant supply streams to cool coolant for the fuel cell and also to cool, for example, a conditioned space or a cabin of a vehicle.

In another embodiment, the fuel cell system has all the required operative processes of humidifying of the fuel supply and/or oxidant supply streams and absorbing heat from the fuel cell inside of the fuel cell system without any additional device. As a result this fuel cell system contains a solid polymer electrolyte membrane having anode and cathode catalyst layers and cathode and anode separator plates on opposite sides of a fuel cell, which are provided with air (oxidant) for the cathode and fuel reactant gas (hydrogen) for the anode. Each separator plate has a wet side wetted by water from a cathode, and opposing dry side separated by a waterproof or low permeability, heat transfer plate. Outside air as an oxidant stream is directed first across the dry side of the cathode separator plate and then to its wet side, where it flows, picks up evaporated water, and becomes humidified. This moist air stream is transferred to the condenser where the water is condensed out. Simultaneously a fuel supply stream such as a hydrogen stream is directed for cooling across the dry side of the anode separator plate cooled by the heat exchanger plate which separates the wet side and dry side of the anode separator. Hereafter one part of this cold stream is directed to the wet side of the anode separator plate, where this part of the stream flows and becomes humidified across the wet side by evaporation exiting outside. Another part of the cold hydrogen stream, after passing through the dry side of the anode separator plate, is transferred to the condenser for indirect contact with moist air stream from the cathode plate. As a result of this contact, water is condensed from the moist air stream and this air stream is then passed outside.

The cold part of the hydrogen stream, after passing through the condenser, is directed to the wet side of the anode plate where it takes the evaporated water and is passed outside. Water from the condenser is directed for wetting the wet side of the anode separator plate and (if it is necessary) the wet side of the cathode separator plate.

In some cases it is advantageous to organize another similar precooling process for the air reactant stream (oxidant), before passing it through the wet side of the cathode separator plate.

In another embodiment, the outside air and hydrogen streams are directed across respectively the cathode and anode dry sides of the respective separator plates. The air and hydrogen are permitted to flow through the plates from the dry sides to the wet sides of these plates, for example by using perforations in the heat exchanger plates. This action can help to reduce any pressure drop for the moving streams and also to increase the process of heat and mass exchange between the streams on both sides of the separator plate.

The described fuel cell system can thus be a source of electricity power while simultaneously an apparatus for indirect evaporative cooling. In this case outside air, after its passing and cooling across the dry side of the cathode separator plate, is divided into two flows. One flow is directed across the wet side of the cathode separator plate and then to the condenser. The other flow is directed to a consumer, for example, in a conditioned space or a cabin of a vehicle.

BRIEF DESCRIPTION OF THE DRAWINGS

FIG. 3 is a schematic representation of a third embodiment of the invention. This scheme provides a cooling process for coolant 10 and simultaneously a humidifying process of air reactant stream (oxidant) 9 for the cathode 4 of fuel cell 1.

FIG. 5 is a schematic representation of the invention, with an air compressor 14. This scheme provides a cooling process for coolant 10 and simultaneously a humidifying process of an air reactant stream (oxidant) 9 for the cathode 4 and fuel reactant gas stream (hydrogen) 11 for the anode 3 of fuel cell 1 and also a cooling process for an outside air stream 9. The cooling process for air stream 9, before its intake by air compressor 14, increases the density of the air stream 9 and decreases consumption of energy for compression and transportation of the air reactant stream (oxidant) 9 by the air compressor 14.

DETAILED DESCRIPTION OF THE INVENTION

Figure 1:
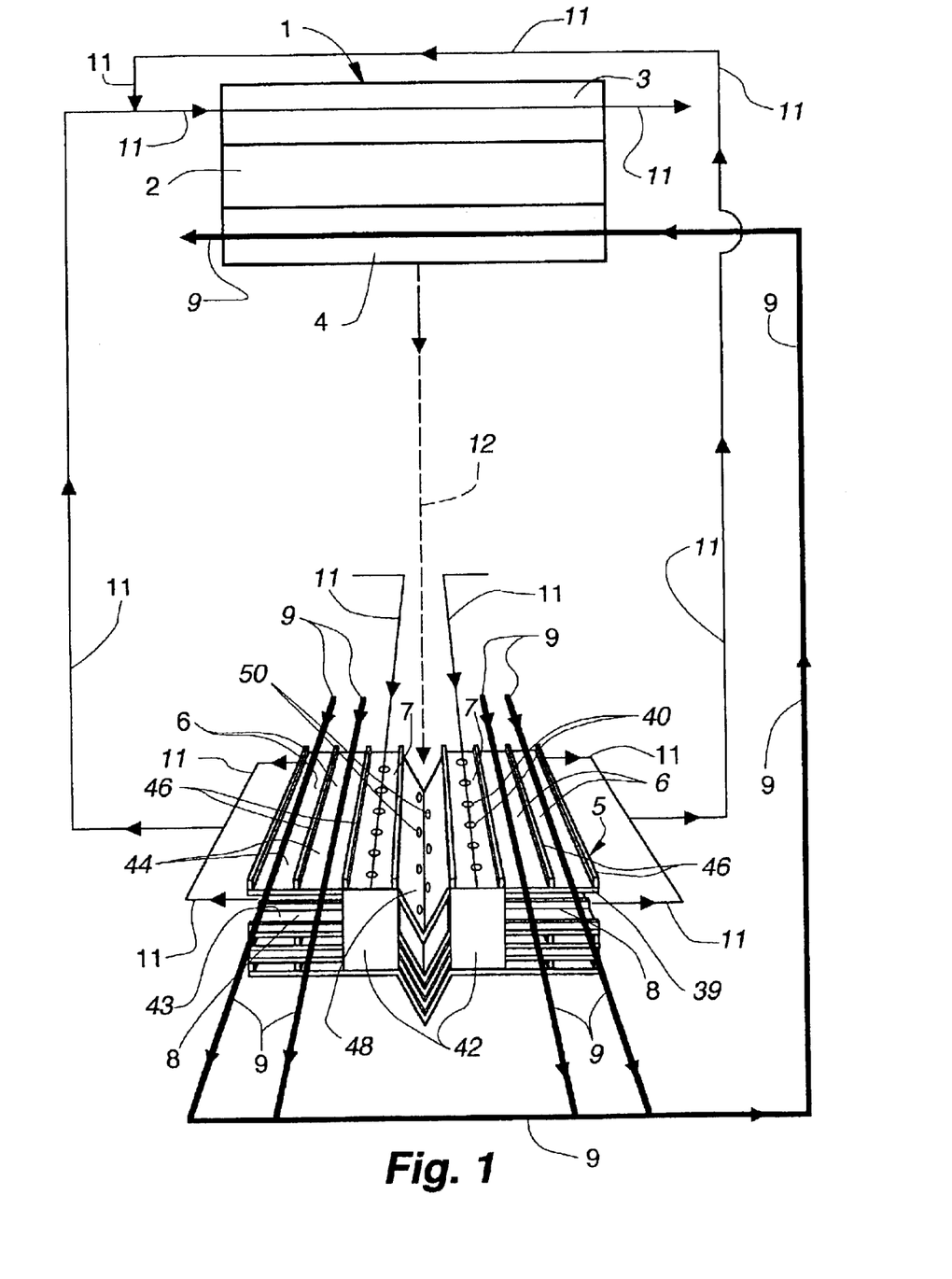
FIG. 1 is a schematic representation of a first embodiment of the invention of the fuel cell systems with evaporative cooling and methods for humidifying and adjusting the temperature of the reactant streams. It contains the fuel cell 1, solid polymer electrolyte membrane 2, anode 3, cathode 4, and an apparatus for indirect evaporative cooling 5 with product channels 6, dry working channels 7 and wet working channels 8, air reactant stream (oxidant) 9, fuel reactant gas stream (hydrogen) 11, and water distribution system 12. Perforations 40 allow passage of working gas from the dry working channels 7 to the wet working channels 8. Barriers 42 prevent the working gas from exiting the end of the dry working channels 7 and mixing with the product gas 9. This scheme is efficient for humidifying the fuel reactant gas stream (hydrogen) 11 for the anode 3 and simultaneously for cooling the air reactant stream (oxidant) 9 for the cathode 4, which absorbs heat from the fuel cell cathode 4.

FIG. 1 schematically shows a fuel cell system with evaporative cooling and a method for humidifying and adjusting the temperature of the reactant streams. This scheme is efficient for the humidifying process of the fuel reactant gas stream (hydrogen) 11 for the anode 3 and simultaneously for the cooling process of the air reactant stream (oxidant) 9 for the cathode 4, which absorbs heat from the fuel cell 1 reaction.

The fuel cell 1 and evaporative cooling system 5 of FIG. 1 operates as follows. Outside air as the air reactant stream (oxidant) 9 passes through the product channels 6 of the cooling apparatus of the evaporative cooler 5 where it is cooled below the wet bulb temperature and approaches the dew point temperature without adding humidity. Examples of this apparatus are described in detail in co-owned PCT Applications PCT/US01/0408 and PCT/US01/04082 filed in Feb. 7, 2001, which are incorporated herein by reference. Also incorporated herein by reference are co-owned PCT application PCT/US01/30468 filed Sep. 27, 2001, U.S. patent application Ser. No. 09/966,928 filed Sep. 27, 2001, and U.S. Provisional Patent Application Serial No. 60/236, 047 filed Sep. 27, 2000 as well as U.S. patent application Ser. No. 10/316,775 filed Dec. 11, 2002 and U.S. Provisional Patent Application Serial No. 60/341,206 filed Dec. 12, 2001.

In this light, the evaporative cooler 5 of FIG. 1 includes a stack of heat exchanger plates 39 with respective wet sides 43 and dry sides 44. These heat exchanger plates 39 are preferably impervious to water as well as the fuel and oxidant gases and any other fluids used in the fuel cell. As discussed above, the heat exchanger plates 39 as shown in FIGS. 1–6 can be stacked to create a compact multi-plate cooler 5. In these illustrated embodiments, the apparatus 5 is also divided into two symmetrical (left and right) parts or halves. In this manner, it is possible to move streams of different fluids through the various channels 6–8 on each half of the apparatus 5 separately without mixing with the other streams.

Referring again to the embodiment of FIG. 1, the stacked plates 39 are arranged so that any two adjacent plates 39 have similar sides (wet 43 or dry 44) opposing or facing each other. The opposite side of each is then an opposite type which in turn faces the same type of side or surface (i.e., wet or dry) of the heat exchanger plate 39 above or below. Thus for a stack 5 as shown, if the first plate 39 has its dry side 44 on its upper surface and its wet side 43 on the lower surface, the next plate 39 down will have its wet side 43 up and then each successive plate 39 alternates. This alternating sequence goes on for as many plates 39 as are desired. To separate adjacent plates 39, rods 46 are used. The rods 46 are positioned so as to create and separate respective channels 6–8 in the spaces separating the adjacent plates 39.

The channels in the space on the wet side 43 of the heat exchanger plate 39 form wet working channels 8. These channels 8 run from the center line of the respective heat exchanger plate 39 in apparatus 5 outward, at an angle relative to the center line and have an exit at the outer edges of the heat exchanger plates 39. In the dry channels 6 and 7 of FIG. 1 including those between two adjacent heat exchanger plates 39 where the facing sides are the dry sides 44 of the heat exchanger plates 39, the channels 6 and 7 are parallel to the center line of the heat exchanger plate 39. In this dry space as shown in FIG. 1, there are two types of channels, the dry working channel 7 adjacent to the center line and the separate product channels 6 parallel to the dry working channel 7 toward the outer edge of the heat exchange plate 39.

The dry 7 and wet 8 working channels are in communication with each other by way of perforations or holes 40 through the heat exchanger plate 39 in the area of the dry working channel 7. The product channel 6 is kept separated from the working channels 7 and 8 other than for heat transfer across the thickness or width of the heat exchanger plate 39. Water is used to wet the wet sides 43 of the heat exchanger plates 39. As working gas 11 passes first through the dry working channel 7 and then through the perforations 40, the working gas 11 enters the wet working channels 8 and there takes on the evaporated water, thereby cooling the heat exchanger plate 39.

In order to direct and constrain the working gas 11 to pass through the perforations 40 from the dry working channel 7 to the wet working channel 8, the dry working channel 7 is blocked at the end of the stack of heat exchanger plates 39 by the barriers 42. Thus the working gas 11 is prevented from exiting the stack and mixing with the product gas 9. In the illustrations of the stack of heat exchanger plates 39 in FIGS. 1–6, the top is shown open for clarity. In order to form the top channels 6 and 7 on the top plate 39, a covering member or members would be added. Further, the illustration of the stack such as in FIG. 1 shows a trough shape 48 along the center line of the plates 39 with water holes 50 inside each trough 48. Each trough 48 in this regard is used to distribute water to the wet surfaces or sides 43 of the heat exchanger plates 39 within the stack. Water would be put into the trough area and would cascade through the holes 50 into the next layer below. These troughs could be on the edges of the plates and alternate ways of distributing water to the wet sides 43 of the heat exchanger plates 39 could also be used if desired.

Figure 7:
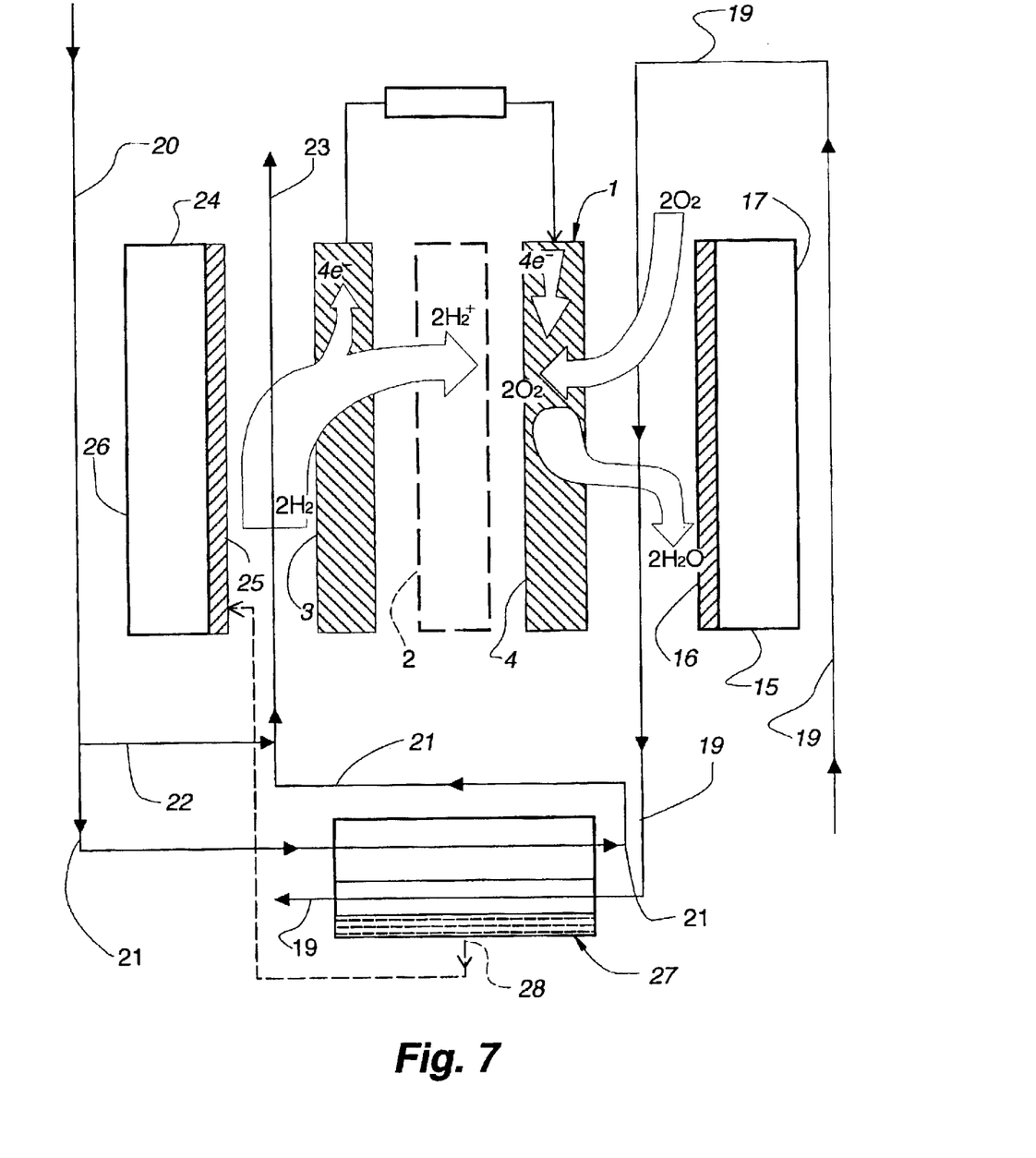
FIG. 7 is a schematic representation of the invention of the fuel cell systems with evaporative cooling and methods for humidifying and adjusting the temperature of the reactant streams, where all required operative processes of humidifying the fuel supply and/or oxidant supply streams and absorbing heat from the fuel cell are inside the fuel cell system. This embodiment includes a cathode separator plate 15 with a wet side 16 and dry side 17; anode separator plate 24 with a wet side 25 and dry side 26; air reactant stream (oxidant) 19, fuel reactant gas stream (hydrogen) 20, and water transportation 28. Fuel reactant gas stream (hydrogen) 20, after passing through the dry side 26 of the anode separator plate 24 is divided into two flows 21 and 22. One cold flow 22 is directed to the wet side 25 of the anode separator plate 24 and the other cold flow 21 is directed via the condenser 27 to the same wet side 25 of the anode separator plate 24 in a mixture with 22 into a common flow 23.
Figure 8:
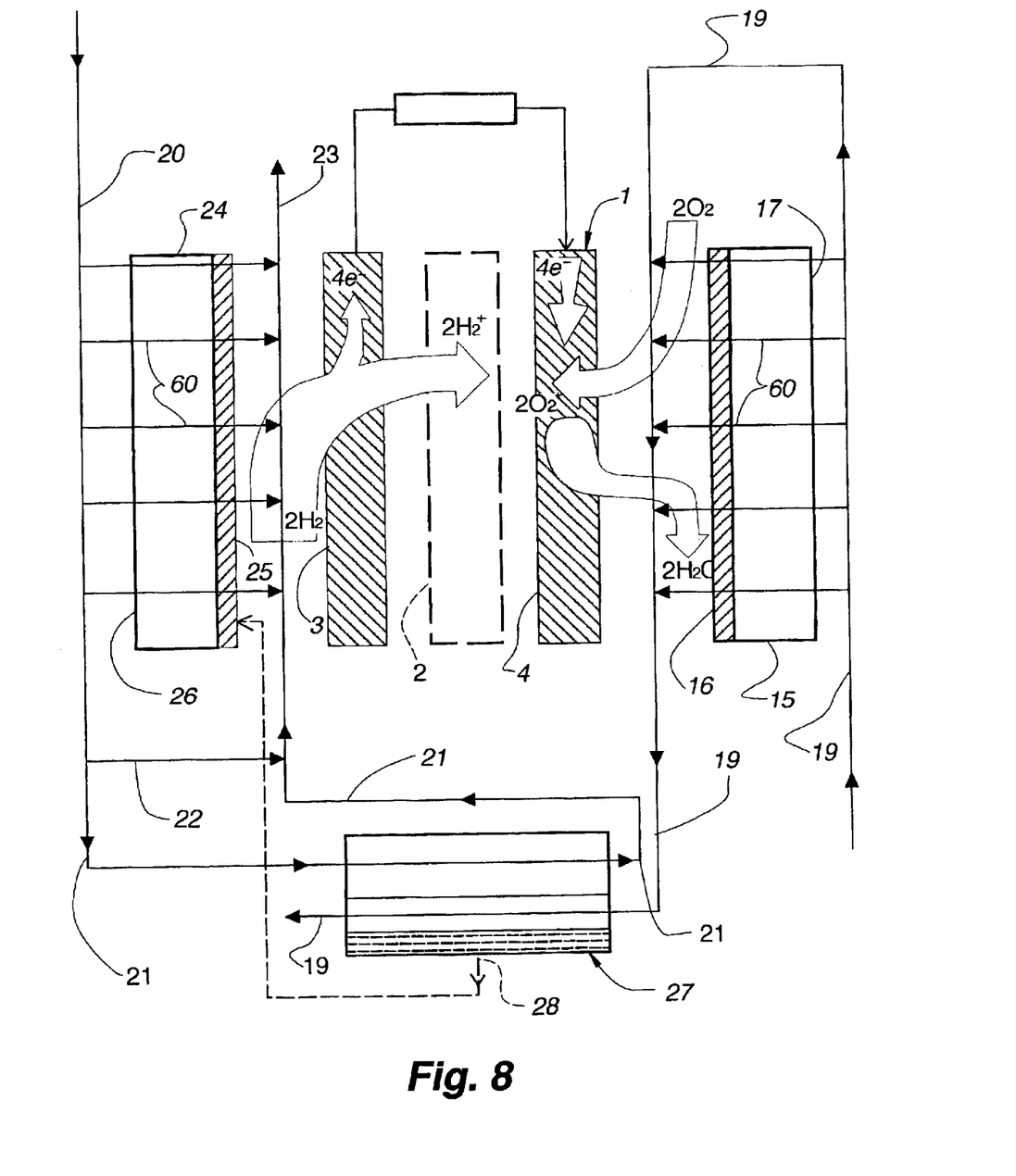
FIG. 8 is a schematic representation of the invention similar to FIG. 7 but in this case perforations 60 of the heat exchanger plates reduce the pressure drop for the reactant streams 19 and 20 and increase the process of heat and mass exchange between the streams. Here the air reactant stream (oxidant) 19 is moving first through the dry side 17 and then the wet 16 side of the cathode separator plate 15. This directs the air reactant stream 19 through the thickness of the cathode separator plate 15 from its dry side 17 to the wet side 16. Simultaneously fuel reactant gas stream (hydrogen) 20 is moving first through the dry side 26 and then the wet side 25 of the anode separator plate 24. This directs the fuel reactant gas stream 20 through the thickness of the anode separator plate 24 from its dry side 26 to the wet side 25.
Figure 9:
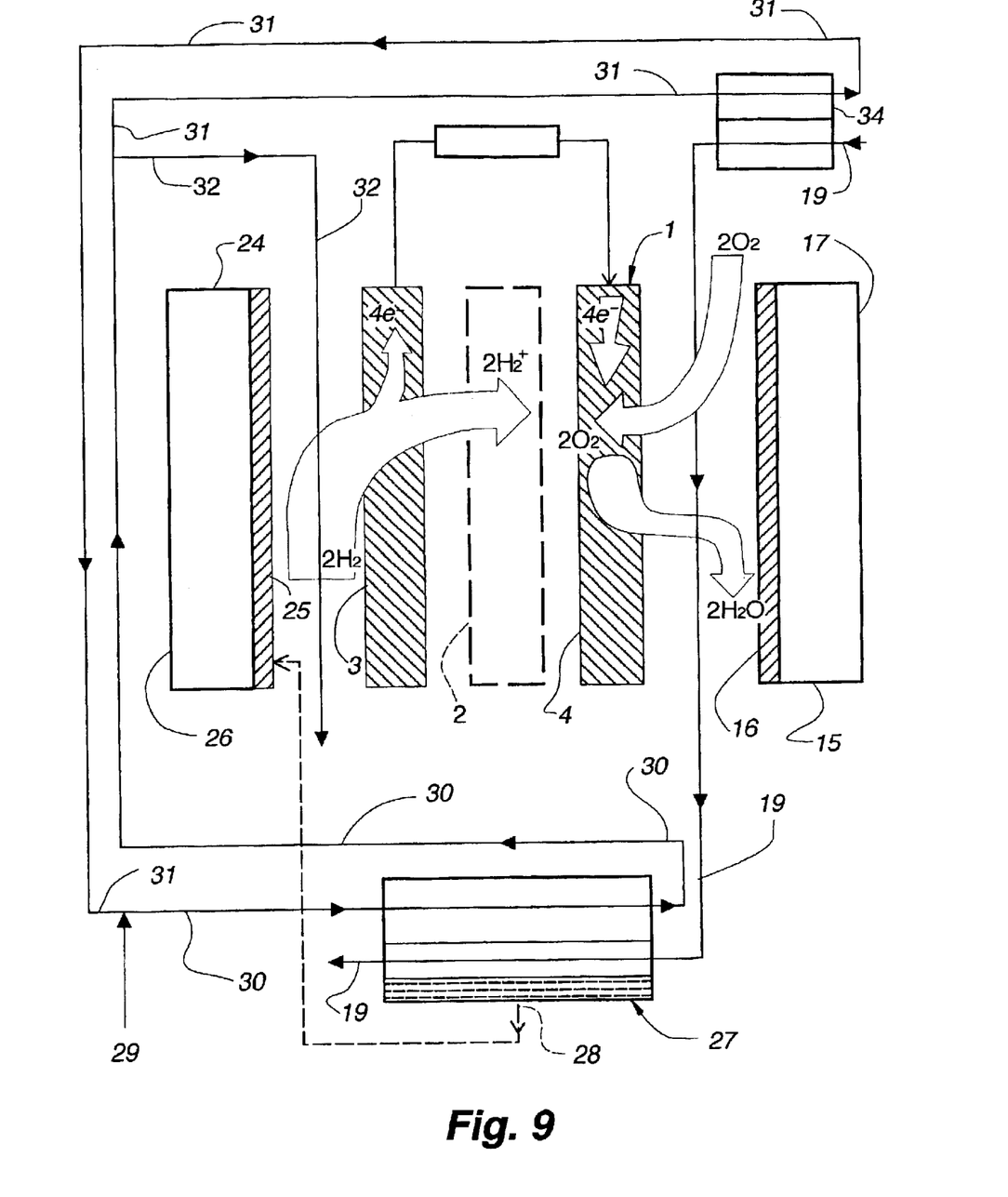
FIG. 9 is a schematic representation of the invention as in FIG. 7 but in this case it is possible to direct a precooling process for air reactant stream (oxidant) 19, before passing through the wet side 16 of the cathode separator plate 15. This embodiment includes incoming fuel reactant gas stream (hydrogen) 29 which mixes with 31 and becomes stream 30. Stream 30, after passing through the condenser gas to the dry side 26 of the anode separator plate 24, is divided into two flows 31 and 32. One flow 31 is directed to the precooler 34 and the other flow 32 is directed to the wet side 25 of the same anode separator plate 24.

Additional embodiments of the wet and dry side heat exchanger plate of the present invention are illustrated in FIGS. 7–9. In them, the fuel cell has separation plates 15 and 24 that are the heat exchanger plates and perform the cooling process of the flows with humidity being added by the evaporation resulting in the cooling across the wet sides 16 and 25 of the heat exchanger plates. The flow of fuel gas is first directed across the dry side 26 of the heat exchanger plate 24 in the anode separator 24 and then across the wet side 25 of the plate through a fuel passageway formed by the anode 3 and the wet side 25 of the heat exchanger plate 24 of the anode. The water present is evaporated adding humidity to the fuel gas and cooling the heat exchanger plate 24 and the fuel on the dry side 26. Similarly the oxidant gas 19 first passes across the dry side 17 of the heat exchanger plate 15 of the cathode separator 17 and then, either directly or after other uses such as another cooler 34, is directed across the wet side 16 of the heat exchanger plate 15 through an oxidant passageway formed by the cathode 4 and the wet side 16 of the cathode separator. In doing so, the oxidant picks up evaporated water and cools the heat exchange plate 15 and the oxidant gas 19 on the dry side 17.

Referring again to FIG. 1 and after passing through the product channels 6, the cold air stream as air reactant stream (oxidant) 9 is directed to the cathode 4 of the fuel cell 1. Simultaneously fuel reactant gas stream (hydrogen) 11 is passed through the dry working channels 7, which are along side the product air stream 9 but not in contact. As discussed above, the individual product channels 6 and dry working channels 7 are separated by rods 46 with the upper surface or side 44 of the heat exchanger plate 39 forming the flow of the channels 6 and 7. Covering plates or membranes on each side or half of apparatus 5 would normally cover the upper channels 6 and 7 of FIG. 1 to enclose them. These plates or covering members are not shown in FIG. 1 for clarity. This upper surface 44 of the heat exchanger plate 39 is a waterproof or water impervious, dry side and there is an opposing lower side of the plate 39 that is wetted by water from the cathode 4 via water distribution system 12. This lower wetted surface or side of the heat exchanger plate 39 helps to form the wet working channels 8, which are connected with the dry working channels 7 by holes or perforations 40 in the heat exchange plate 39. The fuel reactant gas stream (hydrogen) 11 is directed through the holes 40 from the dry working channels 7 into and then through the wet working channels 8, where its moisture increases due to evaporation of the water in the channels 8. Thereafter this moist fuel reactant gas stream (hydrogen) 11 is directed to the anode 3 of fuel cell 1.

The incoming fuel reactant gas stream (hydrogen) 11 is cooled as it moves through the dry working channels 7 over the upper side 44 of the heat exchanger plate 39 which in turn is cooled by the fuel reactant gas stream 11 passing through the wet working channels 8 and evaporating the moisture present on the wet underside of the heat exchanger plate 39. The next adjacent heat exchanger plate 39 that forms the top surface of the dry working channel 7 and product channels 6 is also cooled. Thus for a stack of heat exchanger plates 39 as shown in 5, the dry levels are cooled by those wet levels above and below the dry levels by the cooled heat exchanger plates 39. As the fuel reactant gas stream 11 is cooled in the dry working channels 7, its temperature continually drops approaching the dew point temperature of the incoming fuel reactant gas stream 11. In a similar manner, the air reactant streams 9 are cooled as they flow through product channels 6.

This scheme efficiently humidifies the fuel reactant gas stream (hydrogen) 11 in the wet channels 8 before being directed to the anode 3 and simultaneously aids the cooling process of the air reactant stream (oxidant) 9 for cathode 4 of fuel cell 1. As cooled, the air reactant stream (oxidant) 9 is also the perfect coolant for absorbing heat from the fuel cell 1 reaction at the cathode 4. It is again noted that the upper channels 6 and 7 in FIG. 1 and subsequent FIGS. 2–7 are shown open for clarity without the covering members that would normally be over them to enclose these upper channels 6 and 7. Also, the heat exchanger 39 on each side of the trough 48 is preferably made from one piece that includes the trough 48 but the plate sections on each side of the trough 48 could be separate pieces if desired.

Figure 2:
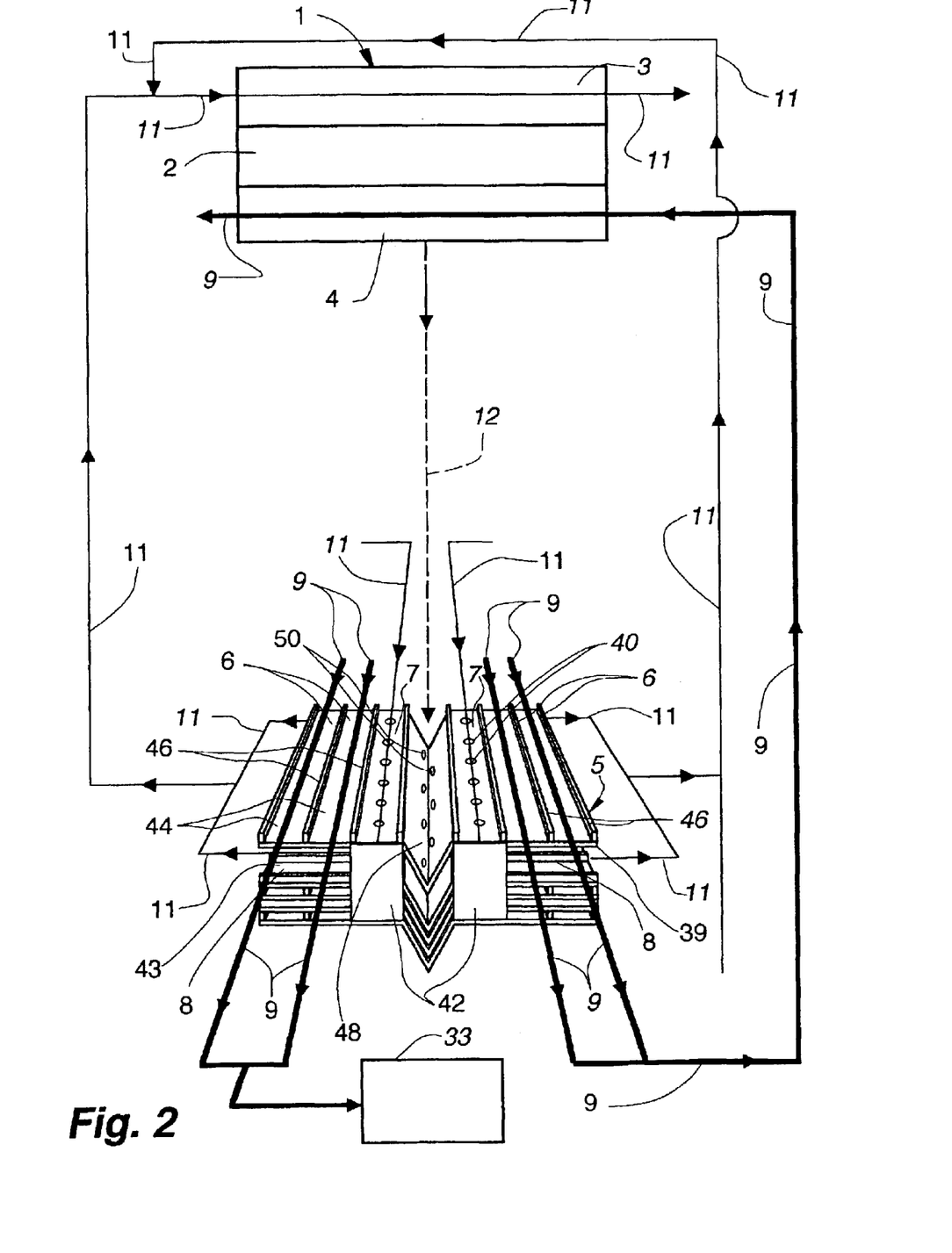
FIG. 2 is similar to FIG. 1 but further includes the conditioned space 33 which is separate from the fuel cell system itself. This scheme allows the temperature and moisture regimes for operation of fuel cell 1 and simultaneously can supply the conditional space 33 with cold air 9 or water.

FIG. 2 is similar to FIG. 1 but this embodiment not only controls temperature and moisture for operation of the fuel cell 1 but also simultaneously can supply cool air or water to the conditioned space 33 at a remote location from the fuel cell 1. Some part of the cold outside air stream 9 (for example, from the left part of the apparatus 5) after passing through the product channels 6 is directed to a consumer in the conditioned space 33 such as the cabin of a vehicle. The other part of the cold outside air stream 9 (from the right part of the apparatus 5) after passing through the product channels 6 is directed as air reactant stream (oxidant) 9 to the cathode 4 of the fuel cell 1. It would also be possible to use water instead of an air stream for the cooled fluid passing through the product channels 6 of the left part of the apparatus 5. This cold water could then be used as coolant for example for the conditioned space 33.

Figure 3:
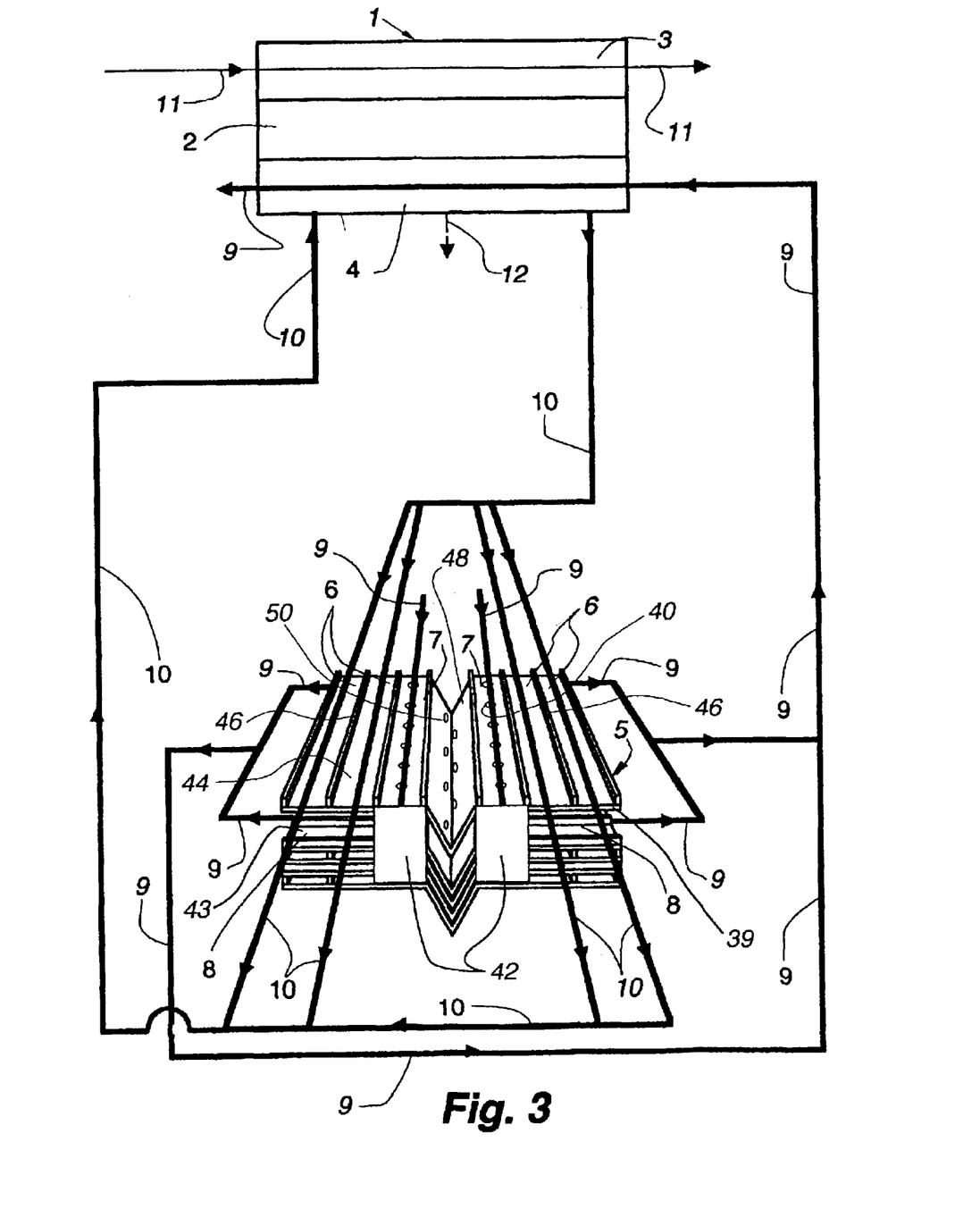

FIG. 3 is a schematic representation of a third embodiment of the invention. This scheme provides the cooling process for coolant 10 (which may be any kind of liquid or gas) and simultaneously humidifies air reactant stream (oxidant) 9 for cathode 4 of the fuel cell 1. In this embodiment, hot and moist coolant 10 from the fuel cell 1 is directed for cooling to the product channels 6 of apparatus 5. Thereafter the cold coolant 10 is returned back to the fuel cell 1 where the cold coolant 10 absorbs heat and moisture from the fuel cell 1. The coolant 10 is then returned to the product channels 6 for cooling. Simultaneously outside air stream 9 is directed to the dry working channels 7, where it passes first through the dry working channels 7 and then through the wet 8 working channels. The resultant moist air reactant stream 9 is thereafter transferred to the cathode 4 of the fuel cell 1.

Figure 4:
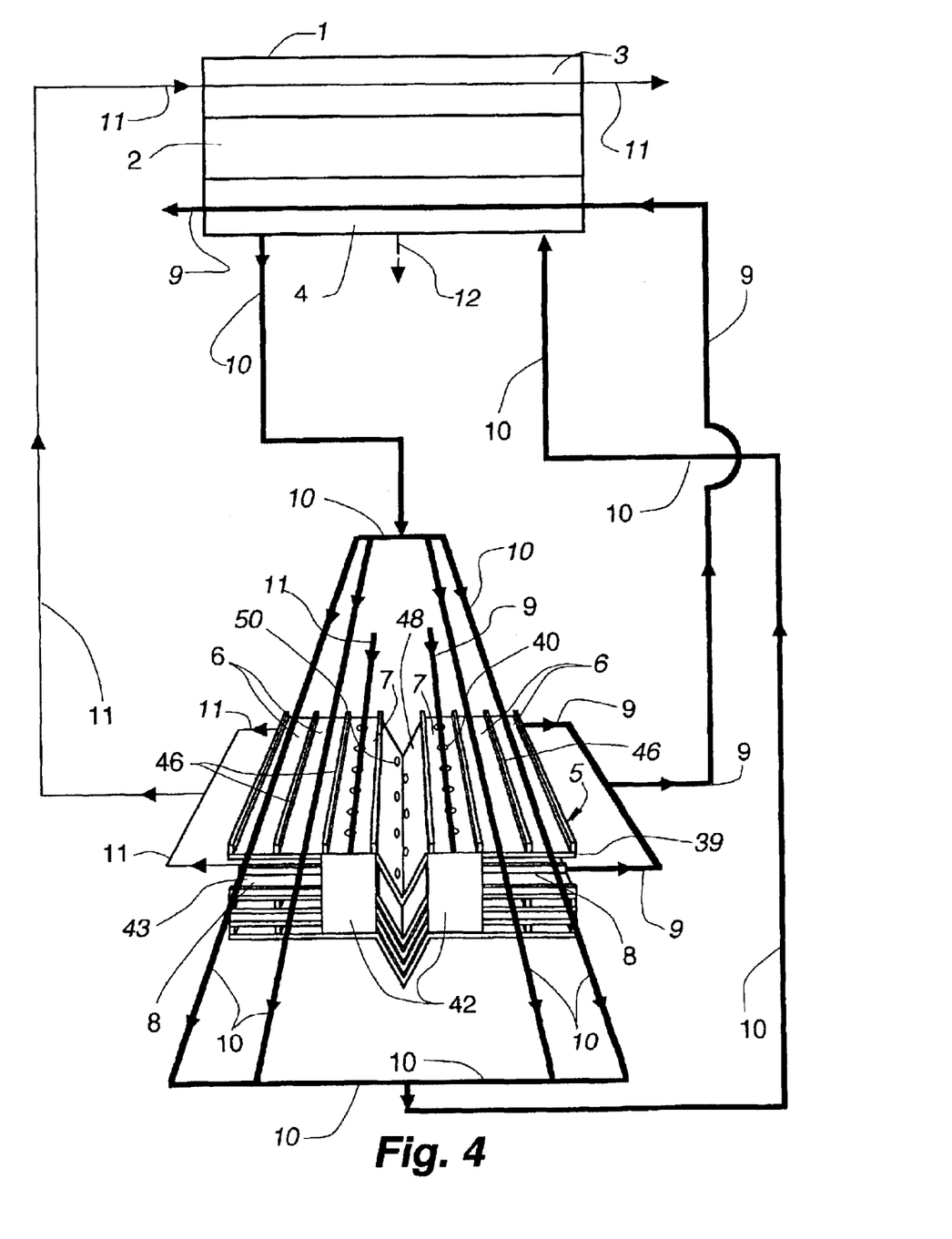
FIG. 4 is similar to FIG. 3, wherein this scheme provides a humidifying process not only of the air reactant stream (oxidant) 9 for cathode 4 but also of the fuel reactant gas stream (hydrogen) 11 for the anode 3 of fuel cell 1.

The embodiment of FIG. 4 provides a humidifying process not only of air reactant stream (oxidant) 9 for the cathode 4 but also the fuel reactant gas stream (hydrogen) 11 for the anode 3 of the fuel cell 1. In it, outside air stream 9 is directed to the dry 7 and then wet 8 working channels of the set of channels 7 and 8 on the right part of an apparatus 5. The moist outside air stream 9 is transferred to the cathode 4 of the fuel cell 1. Simultaneously fuel reactant gas stream (hydrogen) 11 is directed to the dry 7 and then wet 8 working channels of another set of channels 7 and 8 on the left side of apparatus 5. Moist fuel reactant gas stream (hydrogen) 11 is transferred to the anode 3 of the fuel cell 1. The process of cooling the coolant 10 is the same as described in FIG. 3. In this case it is possible to humidify the air reactant stream (oxidant) 9 for cathode 4 and the fuel reactant gas stream (hydrogen) 11 for anode 3 and simultaneously cool the coolant 10 (air or water) for absorbing heat from the fuel cell 1. As mentioned above, the heat exchanger plate 39 at each level preferably is one piece extending from the left to right sides of the apparatus 5 and including the intermediate trough 48 but each side of plate 39 could be separate plate pieces if desired.

Figure 5:
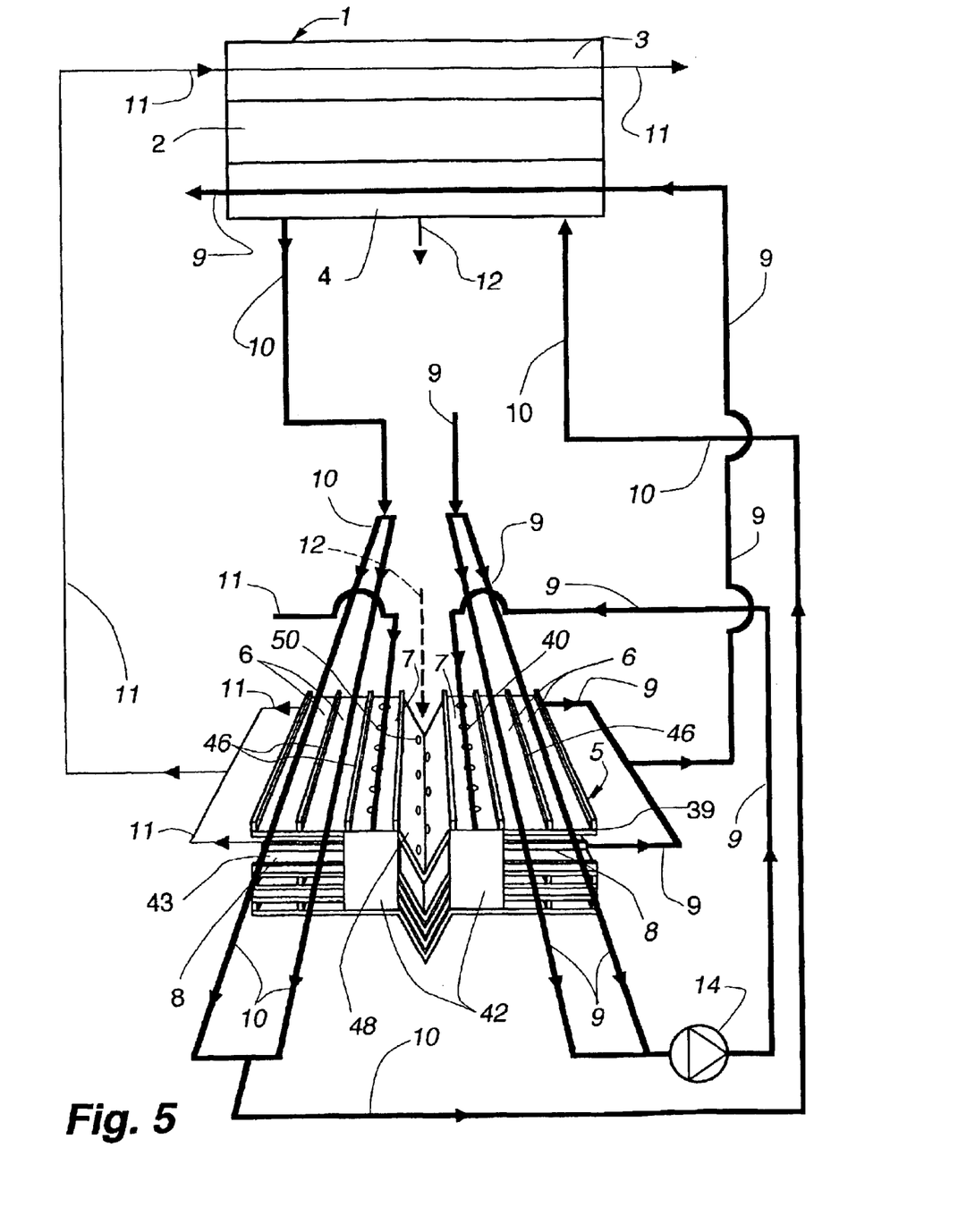

FIG. 5 is a schematic representation of the invention with a method to reduce energy for transportation of the reactants for the fuel cell. This scheme provides the cooling process for coolant 10 and the humidifying process of air reactant stream (oxidant) 9 for cathode 4 and fuel reactant gas stream (hydrogen) 11 for anode 3 of the fuel cell 1. It also provides a cooling process for outside air stream 9. The cooling process for this air stream 9 before its intake by air compressor 14 increases the density of the air stream 9 and decreases the consumption of energy needed for the air compressor 14.

Outside air stream 9 in FIG. 5 is directed for cooling to the product channels 6 of the right side of apparatus 5. During passage through product channels 6 this air stream 9 is cooled. Thereafter this cold air stream 9 enters air compressor 14, which discharges the air stream 9 first to the dry working channel 7 and from there to the wet working channel 8 of the right side of apparatus 5. The moist air reactant stream 9 is directed to the cathode 4 of the fuel cell 1. Simultaneously hot and moist coolant 10 from the fuel cell 1 is directed for cooling to product channels 6 of the left side of apparatus 5, and after passing through them the cold coolant 10 is returned back to the fuel cell 1. Simultaneously the fuel reactant gas stream (hydrogen) 11 is directed first to the dry 7 and from there to the wet 8 working channels of the left side of apparatus 5. Thereafter this moist fuel reactant gas stream (hydrogen) 11 is transferred to the anode 3 of fuel cell 1. Some part of cold coolant 10, after passing through the product channels 6, may be used as coolant for the conditioned space 33 of FIG. 2 if desired.

Figure 6:
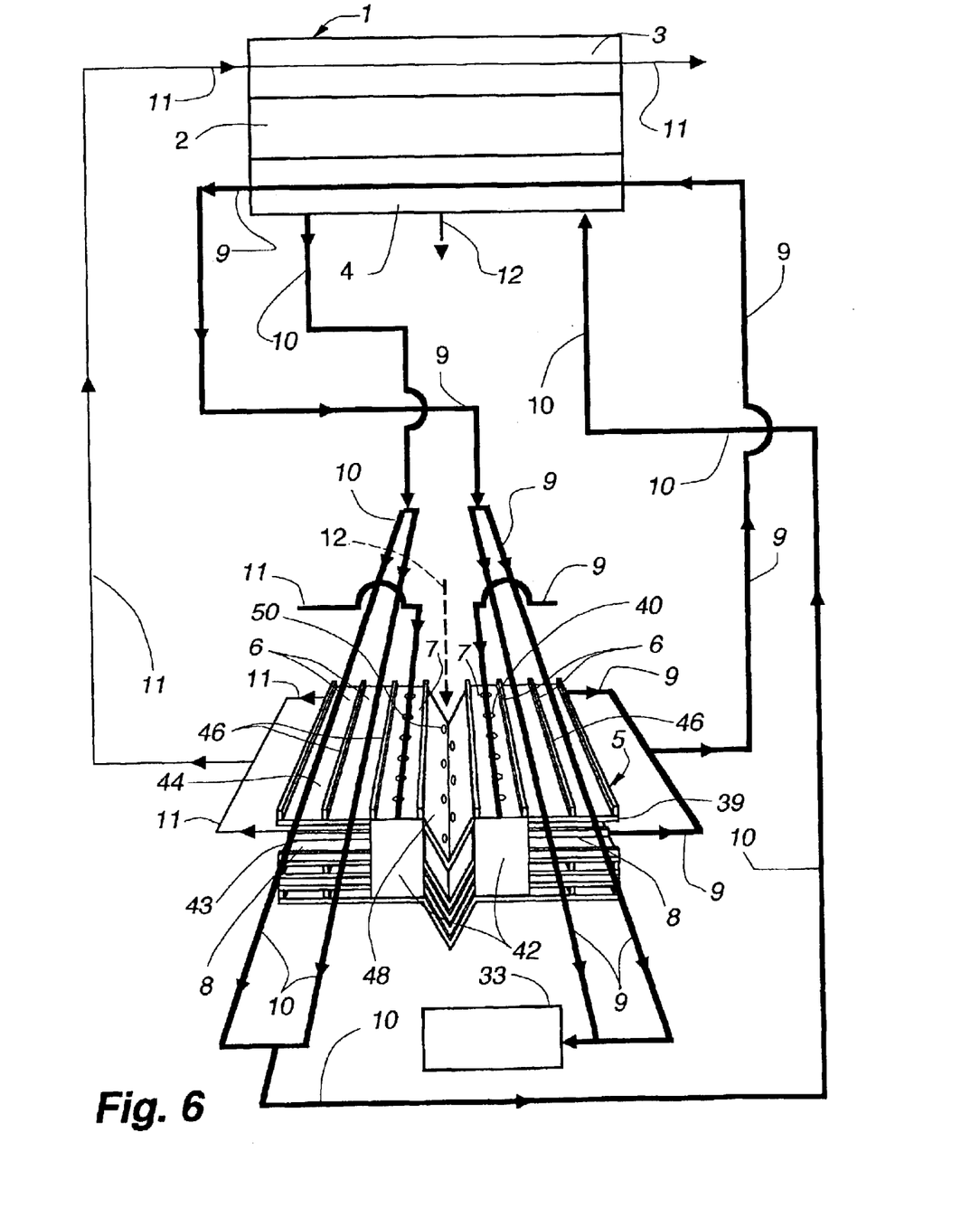
FIG. 6 is a schematic representation of the invention as in FIG. 5 except the cooling process of the air stream 9 is used not for increasing the density of the cold air stream 9 before its intake by the air compressor 14 but rather for cooling conditioned space 33.

FIG. 6 is a schematic representation of another embodiment similar to FIG. 5. The distinction is in the cooling of air stream 9, which is used not for increasing the density of the cold air stream 9 before its intake by air compressor 14, but as coolant for reducing the temperature of the conditioned space 33.

In this case the left side of apparatus 5 is used the same as in FIG. 5. However, on the right side, outside air stream 9 is directed first not to product channels 6 (as in FIG. 5) but to the dry 7 and next wet 8 working channels of the right side of an apparatus 5. Thereafter the moist air reactant stream 9 as an oxidant is directed to the cathode 4 of fuel cell 1. It is thus more moist and heated and is directed from the cathode 4 of the fuel cell 1 to product channels 6 of the right side of apparatus 5. Here it is cooled and dehumidified by heat transfer to the plate 39. The resulting cold and dry air stream 9 is directed to a consumer, for example, in the conditioned space 33 such as a cabin of a vehicle.

The humidity and temperature of the returning air stream 9, after its passage through the fuel cell 1, is higher than the outside air stream 9 (which is passing first to the dry 7 and then wet 8 working channels). This allows for an efficient heat and moisture recovery processes, using heat and moisture from the fuel cell 1 transported to apparatus 5 by the returning air stream 9 passing through the product channels 6 of the right part of the apparatus 5. In this case the heat and moisture from the fuel cell 1 increases the evaporative process for outside air stream 9, during its passage through the wet working channels 8. As a result it increases the humidity of the outside air stream 9, which is directed as air reactant stream (oxidant) 9 for cathode 4 of the fuel cell 1. Moreover when the moist air stream 9 from the cathode 4 is passing through the product channels 6 of the right part of the apparatus 5, it approaches the dew point temperature of outside air. This temperature will be less than the dew point temperature of the moist air stream 9 after its passing through the cathode 4 of the fuel cell 1. In this case some part of the water vapor begins to condense inside product channels 6. The residual dry and cold air stream 9 from the product channels 6 is then directed to conditioned space 33.

The efficient heat and moisture recovery processes, using by-product heat and moisture from fuel cell 1, also is occurring during circulation of returning coolant 10 from fuel cell 1 to product channels 6 of apparatus 5 and back (see FIGS. 3–6). This heat and moisture help to increase the evaporative process for the air reactant stream (oxidant) 9 or fuel reactant gas stream (hydrogen) 11, during its passage through the wet working channels 8. As a result, this increases the humidity of the outside air stream 9, which is directed as air reactant stream (oxidant) 9 for cathode 4 of the fuel cell 1 (for example, see FIG. 3). Also it increases the humidity of the fuel reactant gas stream (hydrogen) 11, which is directed to anode 3 of the fuel cell 1 (for example, see FIG. 4).

FIG. 7 is a schematic representation of the invention of a fuel cell system with an evaporative cooling and method for humidifying and cooling the temperature of the reactant streams 19 and 20. Here all required operative processes of humidifying of the fuel supply 20 and oxidant supply 19 streams and absorbing heat from the fuel cell 1 can be accomplished inside the fuel cell 1 system without any separate device as in prior embodiments. In it, outside air reactant stream 19 as an oxidant is directed first across the dry side 17 of the cathode separator plate 15 where it is cooled due to the heat exchanger plate being cooled by evaporation occurring on the wet side 16. This air stream 19 is cooled below the wet bulb temperature and approaches the dew point temperature of outside air. This process is similar to the cooling process that is occurring for example with outside air stream 9 when it is passing across the dry working channels 7 of the apparatus 5 for dew point indirect evaporative cooling (see FIGS. 3–6).

After passing across the dry side 17 the cold air stream 19 is turned to the wet side 16 of the same cathode separator plate 15 in an oxidant passageway formed between the wet side 16 of the cathode separator and the cathode 4. Here cold air stream 19 is flowing and humidifying across the wet side 16 (absorbing heat from cathode 4 of the fuel cell 1). This process is similar to the process of humidification that is occurring with the outside air stream 9 when it is passing across the wet working channels 8 of apparatus 5 for dew point indirect evaporative cooling (see FIGS. 3–6). Further, this moist air stream 19 is transferred from the oxidant passageway to the condenser 27. There moisture from this air stream 19 is condensed to water 28 by the cold flow of fuel reactant gas stream 21.

Similarly, fuel reactant gas stream (hydrogen) 20 is directed first across the dry side 26 of the anode separator plate 24, where the fuel reactant gas stream (hydrogen) 20 is cooled by the heat exchanger plate which is being cooled by evaporation from the wet side 25. This process is similar to the cooling process which is occurring, for example, with fuel reactant gas stream (hydrogen) 11 when it is passing across the dry working channels 7 of apparatus 5 for dew point indirect evaporative cooling (see FIGS. 1 and 2). After passing across the dry side 26 of the anode separator plate 24 (see FIG. 7) this cold fuel reactant gas stream (hydrogen) 20 is divided into two flows 21 and 22. One cold flow 22 is directed to the fuel passageway formed between the wet side 25 of the anode separator and the anode 3, where it aids in conductively cooling the heat exchanger plate and takes on evaporated moisture which also cools the heat exchanger plate. The other cold flow 21 is directed through the condenser 27 and then to the same wet side 25 of the anode separator plate 24. When flow 23 (which is a mix of flows 22 and 21) is passing across the wet side 25 of the anode plate 24, it is moistened very efficiently. This process is similar to the process of humidification that is occurring with the fuel reactant gas stream (hydrogen) 11 when it is passing across the wet working channels 8 of apparatus 5 for dew point indirect evaporative cooling (see FIGS. 1 and 2). The resultant humidification of the fuel reactant gas stream (hydrogen) 20 increases the hydrogen ion conductivity through the ion exchange membranes 2, and thus improves the fuel cell operation.

Indirect heat exchange occurs in condenser 27 between the cold flow 21 and humid air stream 19. Condensed vapor results because the temperature of the cold flow 21 is always less than the dew point temperature of the humid air stream 19 from the cathode 4. The condensed water 28 from the condenser 27 is used for wetting the wet side 25 of the anode separator plate 24. If it is necessary, this condensed water 28 may also be used for wetting the wet side 16 of the cathode separator plate 15. The heat of condensation, which was absorbed by fuel reactant gas flow (hydrogen) 21, is used to increase the humidifying process when this flow 21 is passing across the wet side 25 of the anode plate 24.

FIG. 8 is a schematic representation of the invention as in FIG. 7 but in this embodiment, it is possible to reduce the pressure drop for the moving reactant streams 19 and 20. Also it is possible to increase the process of heat and mass exchange between the streams. This is enabled by coordinating the motion of the reactant stream 19 or 20 through the heat exchange plate of the cathode 17 or anode 24 through perforations 60 from their dry sides 17 or 26 to the wet sides 16 or 25.

Air reactant stream (oxidant) 19 is directed across the dry side 17 of the cathode separator plate 15. Some part of this stream 19 is flowing through the heat exchange plate of the cathode separator plate 15, from the dry side 17 to the wet side 16 of this plate 15 and into the oxidant passageway, using perforations 60 or some similar transport method. Simultaneously fuel reactant gas stream (hydrogen) 20 is directed across the dry side 26 of the anode separator 24 and into the fuel passageway, where some part of this stream 20 is flowing through the heat exchanger plate of the anode separator 24, from the dry side 26 to the wet side 25 of this plate 24, using perforations 60 or similar means. Gradual moving of the stream from the dry side to the wet side along the length of the plate is better (by reducing the pressure drop) than directing of the whole stream from the dry side to the wet side in the channel passageways (top or bottom) of the plate.

A result is to reduce the velocity of flows (and also any pressure drop) where the flows turn from the dry sides to the wet sides of the plates. In addition, these actions reduce the thickness of any boundary layers on the surface of the plates. As a result, any coefficients of heat and mass transfer between the streams are increased.

FIG. 9 is a schematic representation of the invention as in FIG. 7 but in this case, it is possible to have another precooling process for the air reactant stream (oxidant) 19 before its passage through the wet side 16 of the cathode separator 15. Here the outside air reactant stream 19 as an oxidant is directed for cooling to the precooler 34. Thereafter cold air reactant stream (oxidant) 19 is transferred to the oxidant passageway between the cathode and the wet side 16 of the cathode separator 15. Here it is being humidified as it flows across the wet side 16 and efficiently absorbing heat from the cathode 4. The moist air stream 19 is then transferred to the condenser 27 where moisture from this air stream 19 is condensed by the flow of fuel reactant gas stream 30. Simultaneously the fuel reactant gas stream (hydrogen) 30 (which is a mix of streams 29 and 31) is directed to the condenser 27 and then to the dry side 26 of the anode separator 24 where it is cooled. Thereafter this cold gas stream 30 is divided into two flows 32 and 31. One cold flow 32 is directed to the wet side 25 of the same anode separator plate 24 into the fuel passageway and by evaporation from the wet side 25, it is moistened very efficiently. The other cold flow 31 is directed to the precooler 32 to absorb heat from the outside air reactant stream 19. Thereafter the gas stream 31 is transferred to the condenser 27 together with gas stream 29. Indirect heat exchange is realized in the condenser 27 between gas stream 30 and the humid air stream 19. Humidity is reduced by condensation because the temperature of gas stream 30 is always less than the dew point temperature of the humid air stream 19. The condensed water 28 is transported from the condenser 27 and used for wetting the wet side 25 of the anode separator plate 24. If it is necessary the condensed water 28 may be transported from the condenser 27 for wetting the wet side 16 of the cathode separator plate 15.

Thus the fuel cell systems of the present invention with evaporative cooling and methods for humidifying and adjusting the temperature of the reactant streams have improved arrangements for heat and moisture management for the fuel cells 1. Also simultaneously, if it is necessary, the current method and systems can supply cold and dry air or cool water for the conditioned space 33.

This invention also has improved arrangements for water distribution. Because the water evaporative process from cathode 4 (see FIGS. 1–6) or wet side 16 of the cathode plate 15 (see FIGS. 7, 8 and 9) to the air reactant stream (oxidant) is very active, a large quantity of the product water is evaporating from the cathode 4 into this air stream. In this case the product water is drawn away very actively from the cathode 4 side of the fuel cell 1, thereby avoiding flooding of the electrolyte membrane 2.

By using the fuel cell systems of the present invention with evaporative cooling and the above methods for humidifying and adjusting the temperature of the reactant streams, it is possible to accomplish efficient and inexpensive positive results simultaneously including the processes of absorbing and using the reactant heat of the fuel cell, humidifying the fuel supply stream and/or the oxidant supply stream of the fuel cells, and water management for the fuel cells. With this invention, the productivity of the fuel cells is increased.

While several embodiments of the present invention have been shown and described in detail, it is to be understood that various changes and modifications could be made without departing from the scope of the invention.

We claim:

1. A fuel cell having an anode and cathode separated from one another, said fuel cell creating water at the cathode thereof, and an evaporative cooler to adjust the moisture and temperature of fuel and oxidant for the fuel cell wherein the evaporative cooler comprises:

a heat exchanger plate with dry and wet sides impervious to water, fuel and oxidant, said heat exchanger plate forming at least parts of first and second sets of interconnected dry and wet working channels with said dry working channel of each set being on the dry side of the heat exchanger plate, and said wet working channel of each set being on the wet side of the heat exchanger plate, said heat exchanger plate further forming at least part of at least one product channel, said product channel being separated from said dry and wet working channels;

means for providing at least some of the water produced by the cathode to the wet working channels;

means for directing the adjusted fuel to the anode of the fuel cell; and means for directing the oxidant to the the cathode of the fuel cell;

wherein at least one of either the oxidant or the fuel passes first through the dry working channel and then the wet working channel of each set to pick up evaporated water from the wet working channel and hence cool the heat exchanger plate; and wherein at least one of either the fuel or the oxidant for the fuel cell passes through the product channel of each set to be cooled by the heat exchanger plate.

2. The apparatus of claim 1 wherein the fuel passes though the dry and wet working channels and the oxidant passes through the product channel.

3. The apparatus of claim 1 wherein the oxidant passes though the dry and wet working channels and the fuel passes through the product channel.

4. The apparatus of claim 1 wherein fuel passes through at least one set of dry and wet working channels and oxidant passes through at least one set of dry and wet working channels.

5. The apparatus of claim 1 further including at least a second product channel wherein oxidant is passed through the second product channel and cooled therein, said oxidant from the second product channel being directed to a location separate from the fuel cell to cool said separate location.

6. A method for adjusting moisture and temperature of fuel and oxidant in a fuel cell having an anode and a cathode in which water is produced at the cathode comprising the steps of:

a) passing fuel through a dry working channel of an evaporative cooler, b) directing the fuel into a wet working channel moistened by water, c) cooling a wall of the wet working channel by evaporating the water in the wet working channel, d) adding the moisture from the evaporation of step (c) to the fuel passing through the wet working channel, e) directing the moist fuel to the anode of the fuel cell, f) cooling an oxidant by directing the oxidant to a product channel, said product channel being in heat transfer relationship with the wall of the wet working channel being cooled by the evaporation of step (c), and g) directing the cooled oxidant to the cathode of the fuel cell to cool the cathode, and h) directing water produced by the cathode to wet the wet working channel.

7. The method of claim 6 comprising the additional step of cooling a coolant in a separate product channel, said separate product channel being in heat transfer relationship with the cooled wall of the wet working channel of step (c).

* * * * *